US007760090B2

(12) United States Patent
Lea

(10) Patent No.: US 7,760,090 B2
(45) Date of Patent: Jul. 20, 2010

(54) ACCESS CONTROL APPARATUS

(75) Inventor: Richard Walter Lea, Leicestershire (GB)

(73) Assignee: R.W.L. Consultants Limited, Caldecote, Leicestershire (GB)

( * ) Notice: Subject to any disclaimer, the term of this patent is extended or adjusted under 35 U.S.C. 154(b) by 456 days.

(21) Appl. No.: 11/572,554

(22) PCT Filed: Jul. 25, 2005

(86) PCT No.: PCT/GB2005/002896

§ 371 (c)(1),
(2), (4) Date: Apr. 26, 2007

(87) PCT Pub. No.: WO2006/008549

PCT Pub. Date: Jan. 26, 2006

(65) Prior Publication Data

US 2008/0055081 A1 Mar. 6, 2008

(30) Foreign Application Priority Data

Jul. 23, 2004 (GB) ................................. 0416583.3

(51) Int. Cl.
*G08B 13/18* (2006.01)
(52) U.S. Cl. ........................ 340/556; 340/552; 340/554; 340/507; 340/679; 348/161; 348/156; 382/181; 382/152
(58) Field of Classification Search ................ 340/555, 340/552, 541, 556, 567, 573.1, 679, 680, 340/507; 348/143, 161, 156; 382/181, 152; 250/559.22, 559.24, 559.26, 221
See application file for complete search history.

(56) References Cited

U.S. PATENT DOCUMENTS 4,656,462 A * 4/1987 Araki et al. ................. 340/556
5,138,638 A * 8/1992 Frey .............................. 377/6

(Continued)

FOREIGN PATENT DOCUMENTS

EP          1 387 121 A2      2/2004

(Continued)

OTHER PUBLICATIONS

International Search Report from corresponding International Application No. PCT/GB2005/002896 dated Oct. 20, 2005.

*Primary Examiner*—George A Bugg
*Assistant Examiner*—Hongmin Fan
(74) *Attorney, Agent, or Firm*—Heslin Rothenberg Farley & Mesiti P.C.; Victor A. Cardona, Esq.

(57) ABSTRACT

An apparatus for monitoring an access portal through an enclosure around a hazard comprises a line-scan camera mounted above the portal so that its linear field of view extends along a generally opposite threshold of the portal and can detect electromagnetic radiation reflected from an object passing through the portal. The apparatus distinguishes signals from the camera corresponding to items that are intended to pass through the portal for example on a conveyor from signals corresponding to items, particularly intruders that are not intended to pass through the portal. The apparatus preferably comprise an elongate sodium discharge lamp mounted above the portal and provided with a reflector so that monochromatic light therefrom is concentrated in a narrow strip extending along the threshold and the camera is sensitive only to this monochromatic light.

20 Claims, 5 Drawing Sheets

U.S. PATENT DOCUMENTS

| | | | |
|---|---|---|---|
| 5,440,127 A * | 8/1995 | Squyres | 250/341.8 |
| 6,002,125 A | 12/1999 | Schubert | |
| 6,428,171 B1 * | 8/2002 | Aoki et al. | 356/634 |
| 6,624,751 B2 * | 9/2003 | Haberer et al. | 340/555 |
| 6,775,012 B2 * | 8/2004 | Wurz et al. | 356/608 |
| 2002/0061134 A1 | 5/2002 | Cofer et al. | |
| 2002/0070860 A1 * | 6/2002 | Wuestefeld et al. | 340/541 |
| 2002/0186299 A1 * | 12/2002 | Cofer | 348/152 |
| 2004/0070751 A1 | 4/2004 | Bergbach et al. | |
| 2006/0086794 A1 * | 4/2006 | Knowles et al. | 235/454 |

FOREIGN PATENT DOCUMENTS

| | | |
|---|---|---|
| EP | 1 387 121 A3 | 2/2004 |
| EP | 1 387 121 B1 | 5/2006 |
| GB | 2 207 999 A | 2/1989 |
| JP | 08-191501 | 7/1996 |

* cited by examiner

ACCESS CONTROL APPARATUS

CROSS REFERENCE TO RELATED APPLICATIONS

This application is a 371 national stage filing of PCT International Application No. PCT PCT/GB 2005/002896, filed on 25 Jul. 2005, and published in English on 26 Jan. 2006, as WO 2006/008549 which claims priority to GB 0416583.3 filed on 23 Jul. 2004, the entire disclosures of which are incorporated herein by reference.

The present invention relates to apparatus for monitoring access to a zone containing a hazard. More particularly but not exclusively it relates to apparatus to detect human access to an enclosed zone through a portal not intended for such access.

It is customary for potentially hazardous machinery or the like to be installed within an enclosure, such as a cage or a casing, which is provided with an access gate, hatch, etc, which is kept closed during operation of the machinery, but which may be opened by authorized personnel when the machinery is not running, for example to adjust or maintain the machinery. A range of safety interlock systems have been devised to prevent opening of the gate, etc, while the machinery is in operation, to prevent the machinery being started while the gate is open, to interrupt operation of the machinery if the gate is opened or forced open, and so forth. These have now reached a state of development in which it is possible to ensure that no-one can enter through the access gate, hatch, etc, and come into contact with hazardous machinery while it is running.

However, many potentially hazardous machines are operated as part of a continuous production line, and require a continuous supply of material or goods to be processed, and continuous removal of processed material or goods. Thus, such machines will usually be linked to incoming and outgoing conveyor systems, such as conveyor belts or the like. These will necessitate permanent openings through any protective cage or casing, through which the conveyor systems and their loads will pass.

Unfortunately, such openings for "goods" may well also provide easy access to an interior of the enclosure for operators, maintenance personnel and the like, allowing them to avoid the inconvenience of going through the correct procedures for entering through the intended gate, etc, and to avoid stopping and starting the machine. The more elaborate and secure the safety arrangement associated with the intended access route, the greater appears to be the temptation to take a short cut by entering through a "goods" opening, either alongside the conveyor or even riding on a moving conveyor belt. Since this by-passes the safety interlocks between the gate and the machinery, there is a real risk that such personnel will be present within the enclosure while the hazardous machinery is still running.

It has thus been necessary to develop apparatus to detect personnel intruding into a safety enclosure or the like through such openings, with the intention of halting the machinery within the enclosure before the intruder can come to harm. Increasingly elaborate light curtain arrangements have been designed which would be broken by objects entering through "goods" openings, but these are expensive and require very accurate alignment of corresponding light transmitters and detectors. These can also become misaligned in situations involving significant vibrations or shocks from operating machinery. It is also necessary to distinguish objects that should be present, i.e. goods, from those that should not, e.g. intruders. The alternative is to disable or "mute" the light curtain while an expected object is passing through. However, this allows an intruder to sneak through at the same time.

Systems have been proposed in which a camera system monitors an area, usually from above, and various image recognition techniques are employed to distinguish items which are allowed to be present in the area from those which are not. For example, European Patent Application No. 1312853 discloses a system in which workers wear orange garments so that an image analysis system may track their positions. Such a system would unfortunately not pick up a worker who has discarded his garment for any reason. European Patent Application No. 1367314 monitors an area around an entrance to an enclosure using a camera, and employs "learned" reference images to distinguish what should be in the area from what should not. The computing power required for this would presumably be quite large, and there is always a concern with complex software that it may not always operate as expected. International Patent Application No. WO 2004/029502 monitors a zone by imaging it with two separated cameras and building up a three-dimensional image. The computing power and complexity of software required are presumably even greater than for systems using monocular vision. German Patent Application No. 4414434 uses a downwardly directed light source, a precisely-angled obliquely-directed camera and image processing software to assess the height and volume of items on a conveyor belt, to distinguish coal miners riding on the belt from piles of coal. Again, this is a complex system.

Another approach has been to provide a standardised background, for example a contrasting chequerboard pattern, a highly reflective strip, as in UK Patent Application No. 2207999, or a "bar-code"-like pattern, as in UK Patent Application No. 2385916, viewed by a conventional camera. This eases image analysis, as it is easier to spot changes against such a background, but it is limited to positions where such a background can be installed. There are also many industrial situations in which such backgrounds could easily become indistinct or obscured unless cleaned frequently—which would itself require production to be halted while cleaning staff worked in the area to be protected.

There have been attempts to emulate the linearity of light curtains by projecting a grid or strip of intense illumination and monitoring this with a conventional camera. However, the arrangements needed to direct this illumination accurately appear complex, for example employing laser beams and pivoting reflectors; whether for complexity or for cost reasons, such systems do not appear to have been widely adopted.

It should be noted that this specification mainly addresses the problems of monitoring openings in safety cages around hazardous machinery, but very similar considerations will apply where a hatch in a machine casing, a filling hopper, or the like must be monitored in case an operator inserts a hand or other body part.

It is hence an object of the present invention to provide apparatus for monitoring a portal through an enclosure around a hazard and distinguishing passage through the portal by approved and non-approved objects that is at least as effective as existing systems but obviates their above drawbacks, such as complexity, reliability and cost.

According to a first aspect of the present invention, there is provided apparatus for monitoring a portal through an enclosure around a hazard, comprising detector means having a substantially linear field of view and adapted to detect electromagnetic radiation, said detector means being so mounted adjacent a first boundary of the portal that said field of view comprises a second boundary of the portal generally opposed to the first such that the detector means will pick up electromagnetic radiation reflected from an object passing through the portal, and means to distinguish signals from said detector means corresponding to an object intended to pass through the portal from signals from the detector means corresponding to other objects.

Preferably, said detector means comprises line-scan camera means.

Advantageously, said line-scan camera means is sensitive to visible light.

The apparatus may comprise a light source so directed as to illuminate said second boundary of the portal.

Said light source may be provided with focussing means adapted to produce a narrow elongate illuminated strip extending substantially along said second boundary.

The light source may comprise elongate discharge lamp means, optionally substantially monochromatic discharge lamp means such as sodium discharge lamp means.

The detector means may be adapted to operate at intervals substantially synchronised with maxima in light output from the discharge lamp means.

Alternatively or additionally, the line-scan camera means may be sensitive to electromagnetic radiation outside the humanly visible spectrum, such as infra-red radiation.

The apparatus may then comprise a source of said electromagnetic radiation so directed as to illuminate said second boundary of the portal.

Said source of electromagnetic radiation may be adapted to operate only at predetermined intervals.

Preferably, the detector means produces signals indicating an intensity of received radiation at a plurality of points along its field of view.

The distinguishing means may compare said detected signals with pre-recorded or theoretical signals corresponding to the presence between the detector means and the second boundary of objects intended to pass through the portal.

The distinguishing means may be adapted to emit an alerting signal should substantially no such correspondence be established.

Said alerting signal may cause operation of visual and/or audible alarm means.

Said alerting signal may initiate procedures to eliminate or reduce the hazard within the enclosure, for example by stopping operation of hazardous equipment and/or by deploying additional barrier means between the portal and the hazard.

The distinguishing means may additionally or alternatively check the symmetry of the detected signal about a predetermined point, such as a midpoint of the field of view.

The distinguishing means may then emit said alerting signal should the detected signal substantially diverge from mirror symmetry about said point.

The distinguishing means may additionally or alternatively compare a duration of the detected signal with an expected time for the passage of objects intended to pass through the portal.

The distinguishing means may then emit said alerting signal should the detected signal indicate passage of an object travelling faster than those intended to pass through the portal.

According to a second aspect of the present invention, there is provided a method for monitoring a portal through an enclosure around a hazard comprising the steps of providing apparatus as described in the first aspect above, generating a signal representing an intensity of received electromagnetic radiation across a field of view of the apparatus and analysing said signal to determine whether an unauthorised object is present within the portal.

Preferably, said analysis step comprises comparing said signal with signals corresponding to presence of an authorised object within the portal.

Advantageously, said analysis step comprises determining whether the signal is symmetrical.

Optionally, said analysis step comprises determining a duration of passage of an object through the portal.

The method preferably comprises the step of reducing the hazard should an unauthorised object present within the portal.

An embodiment of the present invention will now be more particularly described by way of example and with reference to accompanying drawings, in which.

Figure 1:
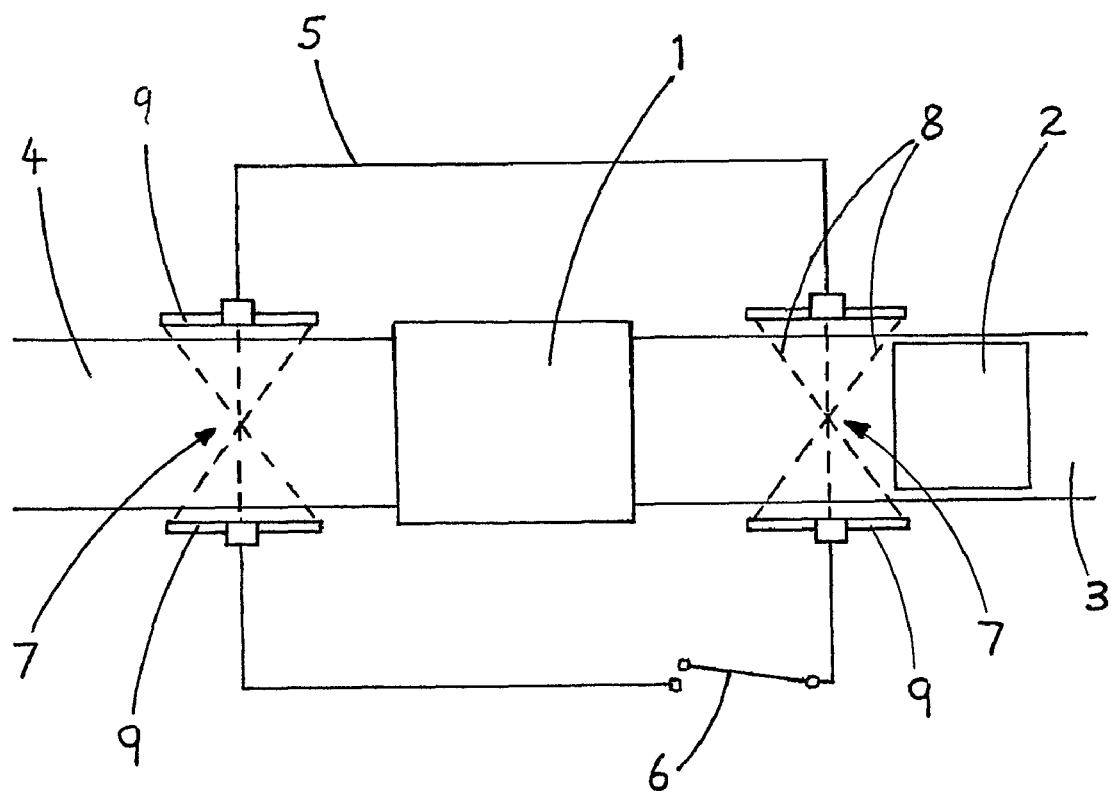
FIG. 1 is a schematic plan view of an existing access monitoring system in use on a production line comprising hazardous machinery within an enclosure.

Referring now to the Figures and to FIG. 1 in particular, a production line comprises a potentially hazardous machine 1, supplied with items to be processed 2 along an incoming conveyor belt 3, and with an outgoing conveyor belt 4 to remove the items after processing. (For example, the machine 1 may be a packaging machine wrapping and/or strapping together a stack of individual items on a pallet).

To prevent human access to the machine 1 whilst it is running, it is surrounded by an enclosure 5 provided with a lockable gate 6. It is normal to provide an interlock arrangement between the gate 6 and the machine 1, such that opening the gate 6 stops the machine 1. Thus, it will not be possible to enter the enclosure 5 through the gate 6 and be injured by operating machinery. Considerable development has been carried out to refine control of access through such gates 6 to make it foolproof and resistant to deliberate attempts to defeat it (it would appear inevitable that some operators or maintenance personnel will attempt to save time or avoid the inconvenience of stopping and restarting machinery by evading such interlock systems provided for their own safety).

Although human access to the enclosure 5 through the approved gate 6 is closely monitored and controlled, it is necessary to provide access points 7 for the conveyor belts 3, 4 and items 2 carried thereon to pass through. Since these access points 7 are configured to allow passage of conveyor belts 3, 4 and items 2 carried thereon, they may well allow human access, too. If the access points 7 were left unguarded, it would be easy for someone to squeeze through next to the conveyor belts 3, 4, or even ride thereon, to enter the enclosure 5 without going through the necessary procedures to open the gate 6 and stop the machine 1.

Various systems have been proposed to monitor such access points 7. It is important that they do not hinder passage of items 2 that are meant to be passing through the access points 7, but they must rapidly and reliably detect anyone or anything else.

The prior art system illustrated in FIG. 1 comprises a series of light curtains 8 arranged across each access point 7, which would be broken by anything passing therethrough. The projection and detection apparatus 9 required to operate these light curtains 8 is however elaborate, expensive and requires precise alignment. Considerable computing power is required to analyse the signals produced when a curtain 8 is broken, to determine whether this is due to passage of an expected item 2. The illustrated system is highly effective, but it is more expensive than many potential users are prepared to bear.

Figure 2:
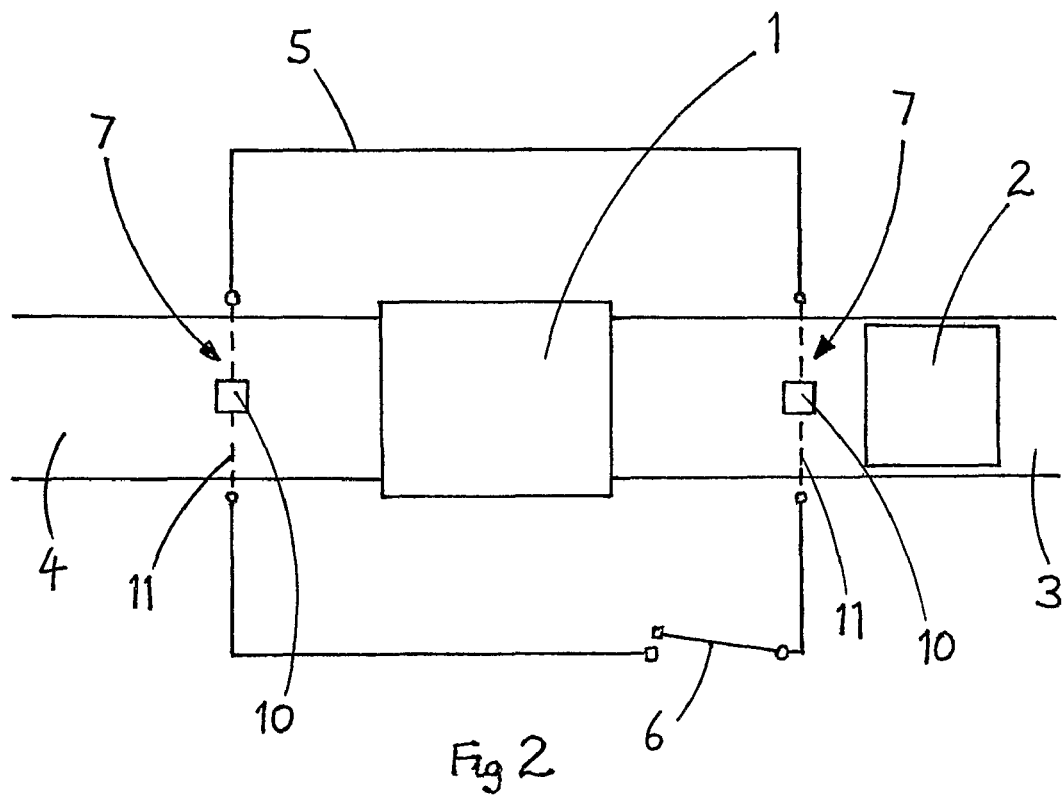
FIG. 2 is a schematic plan view of a first access monitoring system embodying the present invention, in use on the production line shown in FIG. 1.
Figure 3:
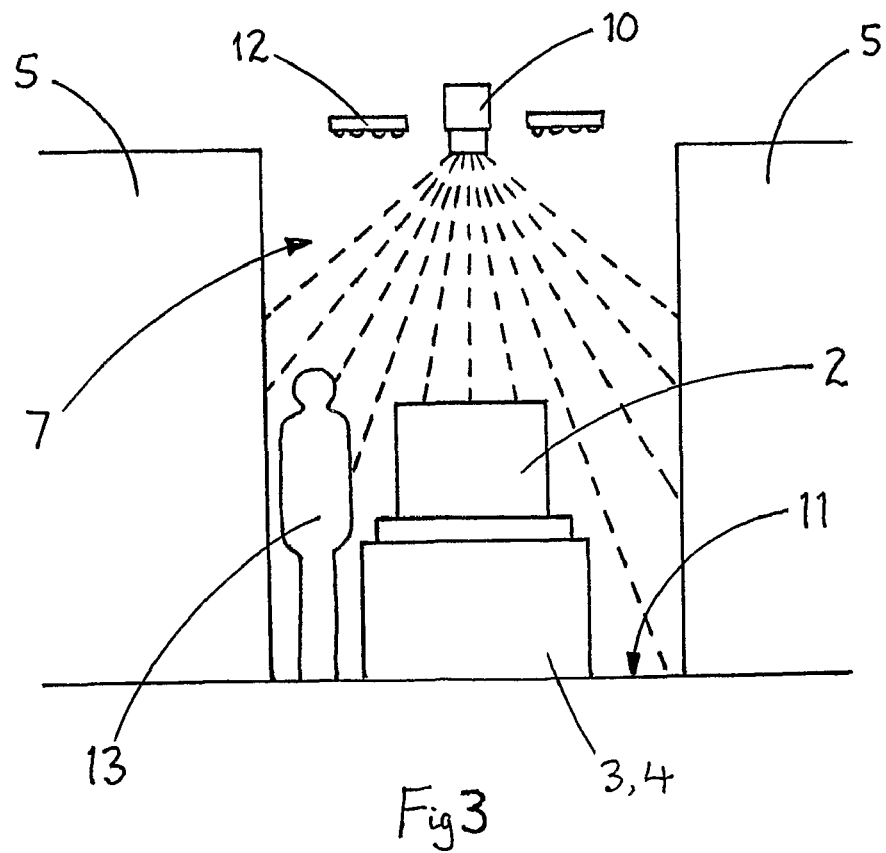
FIG. 3 is a schematic elevation of the access monitoring system shown in FIG. 2, with an intruder present.

A first access monitoring system embodying the present invention is shown in FIGS. 2 and 3, and comprises a line-scan camera 10 mounted above each access point 7 through the enclosure 5. The linear field of view of each line-scan camera 10 extends at least across a threshold 11 of the respective access point 7, and preferably, as shown in FIG. 3, also extends at least part-way up each side of the access point 7.

For a line-scan camera 10 sensitive to visible light, ambient illumination of the access points 7 may well suffice, but in an alternative embodiment, line-scan cameras 10 are used which are sensitive to electromagnetic radiation beyond the range of human vision, such as infra-red radiation. In this case, a source of the appropriate radiation is provided to illuminate the access point 7; here, arrays 12 of infra-red emitting diodes are positioned adjacent the line-scan camera 10. These are controlled to emit flashes of infra-red radiation at predetermined intervals, sufficiently frequently to prevent an object passing through the access point 7 between flashes.

As shown in FIG. 3, an intruder 13 attempting to enter the enclosure 5 through an access point 7, rather than through the gate 6, will pass through the field of view of the line-scan camera 10, whether (as shown) he attempts to pass between an edge of the enclosure 5 and the conveyor belt 3, 4, or whether he attempts to ride on the conveyor belt 3, 4 between items 2. This will inevitably alter the intensity of the light or other electromagnetic radiation reaching the camera 10 from the corresponding direction.

Figure 4:
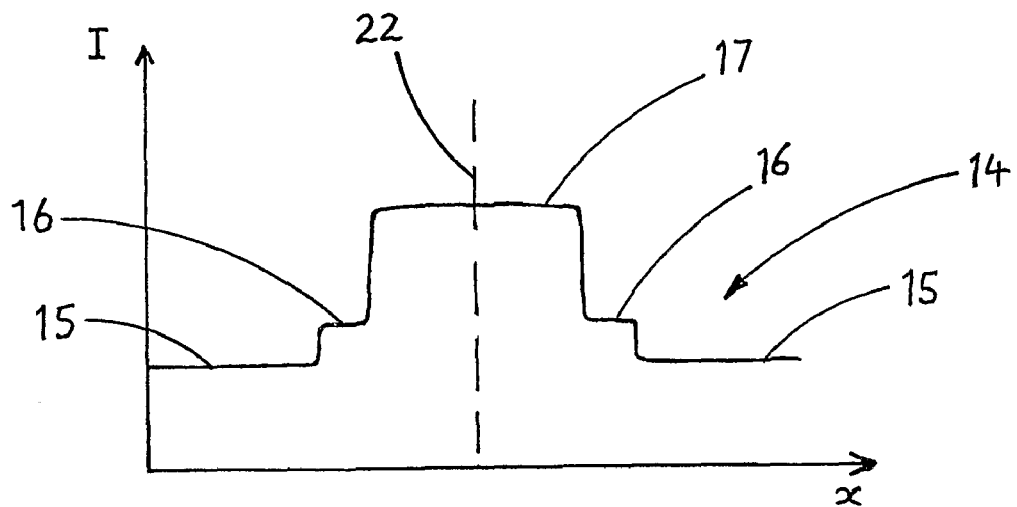
FIG. 4 is a graph of light intensity detected by the system shown in FIG. 2 across a threshold of the enclosure.
Figure 5:
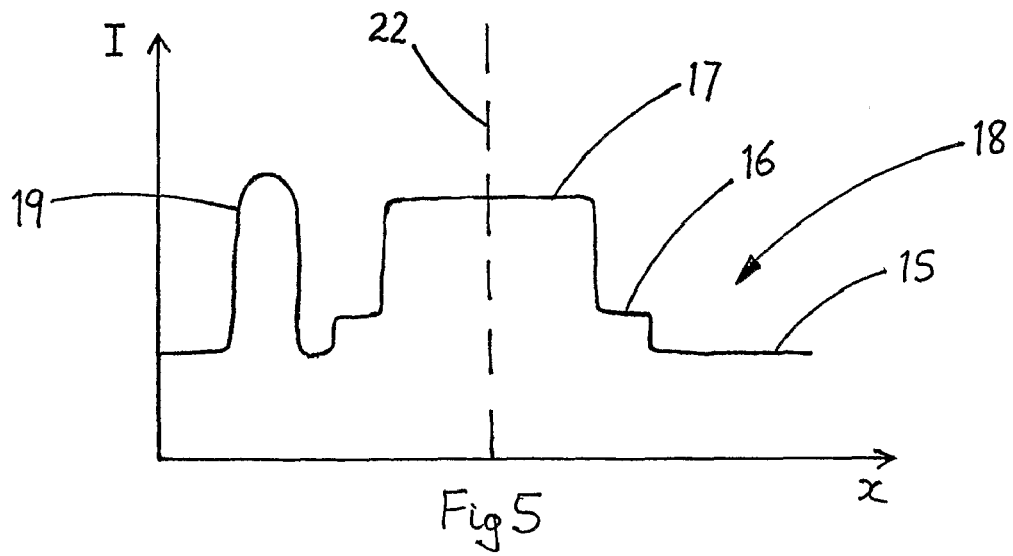
FIG. 5 is a graph of light intensity detected by the system shown in FIG. 2 across the threshold, with an intruder present.
Figure 6:
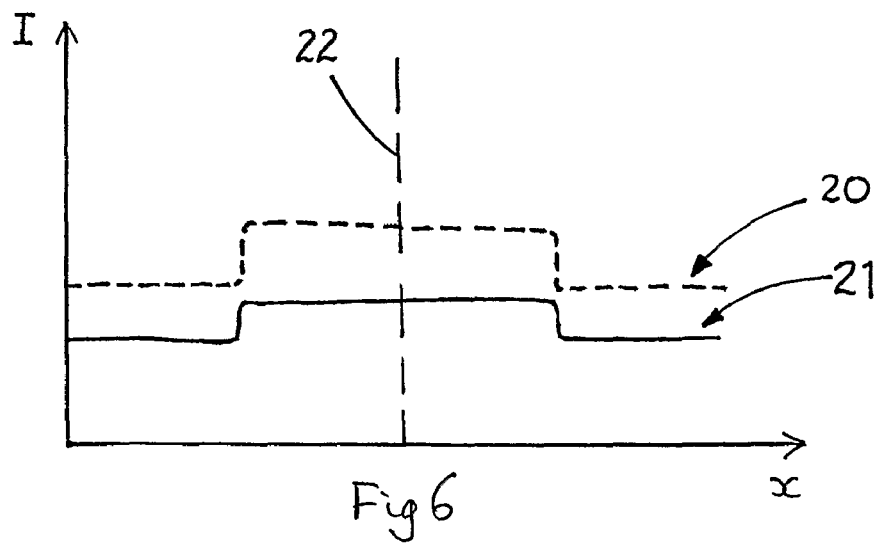
FIG. 6 is a graph comparing light intensity detected by the system shown in FIG. 2 across the threshold, under two differing illumination intensities.

FIGS. 4 to 6 shown graphs of intensity of light (I) reaching the camera 10 plotted against position (x) measured along the field of view of the camera 10. Typically, the camera 10 will be set up to distinguish sixty-four points along the x-axis. A first graph 14 of x versus I represents a situation in which an expected item 2 is passing through an access point 7 beneath the camera 10. A first portion of the graph 14 corresponds to the threshold 11 and sides of the access point 7. A second portion 16 corresponds to the conveyor belt 3, while a third portion 17 corresponds to the item 2. Clearly, if the threshold 11, belt 3, and item 2 have different reflectivities, the exact profile of the first graph 14 will differ from that shown, but for a particular apparatus in a particular location, the profiles of expected items 2 should be substantially consistent. Indeed, if the profile of an item 2 being fed to the machine 1 (or leaving it) is significantly different from that expected, then there is in any case a problem with the process which requires attention.

A second graph 18 of x versus I represents a situation similar to that shown in FIG. 3, in which an intruder 13 is attempting to sneak through the access point 7, at the same time as an item 2 is passing. Here, the second graph 18 has first, second and third portions 15, 16, 17 corresponding to those of the first graph 14, but there is also an extraneous feature 19 resulting from the presence of the intruder 13 in part of the field of view of the camera 10. The exact shape of the feature 19 is not critical, since it does not need to be identified positively. Clearly, the second graph 18 will not match any graph (such as the first graph 14) corresponding to passage of an expected item 2, or to an empty conveyor 3, 4.

When such a non-matching graph is detected, the apparatus instructs the machine 1 to stop, for example by interrupting its power supply, turns off the conveyor belts 3, 4 and optionally sets off alarm bells or flashing lights, or sends an appropriate alerting message to a control room or the like. In other embodiments, extra guards may be moved into position to prevent the intruder 13 contacting hazardous parts of the machine 1, for example where fast-moving parts may take a significant time to slow down, or where the hazard is one such as excessive heat that will not cease immediately power to the machine 1 is cut off.

It is necessary to distinguish genuinely different graphs 18 from graphs that are measurably but irrelevantly different from those expected. For example, a third graph 20 represents a situation in which the conveyor belt 3, 4 passing through the access point 7 is empty, which is one of the most frequently encountered "expected" graphs. A fourth graph 21 represents the same situation, but with different illumination (e.g. under ambient illumination, it is a duller day or a nearly light bulb may have blown). In principle, the fourth graph 21 is significantly different from the third 20, but it would be undesirable to interrupt production merely because the lighting has changed.

A simple approach to distinguishing such irrelevant changes from important ones (such as are shown in FIG. 5) is to consider the symmetry of the graphs of x versus I. In almost every case, the access points 7 themselves and the conveyor belts 3, 4 will be symmetrical. The items 2 will usually be substantially symmetrical and disposed centrally of the conveyor belts 3, 4. Thus, the first 14, third 20 and fourth 21 graphs are symmetrical about a midline 22. However, the second graph 18 is asymmetrical to a significant degree. Even if an intruder 13 attempts to ride into the enclosure 5 on the conveyor belt, 3, 4, it will be practically impossible for him to position himself completely symmetrically and centrally of the belts 3, 4, for his entire passage through the access point 7 beneath the camera 10.

Checking the symmetry of a graph such as those shown is a very simple and reliable procedure, particularly since it is already known where the axis of symmetry should be. Thresholds can be set so that minor asymmetries are ignored, but major asymmetries lead to the machine 1 and belts 3, 4 being stopped, alarms going off and so forth, as described above.

Where the expected items 2 are so shaped as to produce a simple profile for feature 17, a further simple test may be used. The first graph 14 has a single peak, while the second graph 18 has two peaks, features 17 and 19. Therefore, two objects must be passing through the access point 7 at once, and the necessary precautions can be taken, as above.

Another test criterion that may be used is based on a width of an intruder's body 13 almost being substantially different to that of the conveyor 3,4 and almost certainly different to that of an expected item 2. (For example, a standard conveyor is typically around 1.2 meters wide). Thus, feature 19 will be distinguishably narrower than feature 16, and in the situation illustrated, distinguishably narrower than feature 17. Clearly, in the few cases where the expected items 2 on the conveyor 3,4 are roughly the same width as a typical person's shoulders, this test would not be appropriate, but it would be a simple and effective check method otherwise.

An alternative approach usable on its own or in conjunction with the above tests is to differentiate expected items 2 from intruders 13 by the speed of their passage though the access point 7. A typical industrial conveyor 3,4 may travel at 1.5 to 3.0 meters per minute, and so the feature 17 will show up for a significant time on successive graphs, while an item 2 passes through the field of view of the camera 10. An intruder 13 passing through the access point 7 will be moving much faster, of the order of a meter or two per second, and so feature 19 will appear and disappear much more rapidly. Thus, if any feature is present for less than a preselected period, the above precautions can be put into effect.

In many applications, a check on the symmetry of the light picked up by the line-scan cameras 10, and/or one of the other simple tests outlined above, may be sufficient to distinguish expected items 2 from intruders 13, without the need to provide or build up a "library" of approved profiles, for detailed comparison with those measured. This will be cheaper to implement and also a more reliable and robust test then complex image recognition algorithms and the like such as are used at present. In more critical situations, a combination of the above methods may be employed.

Figure 7:
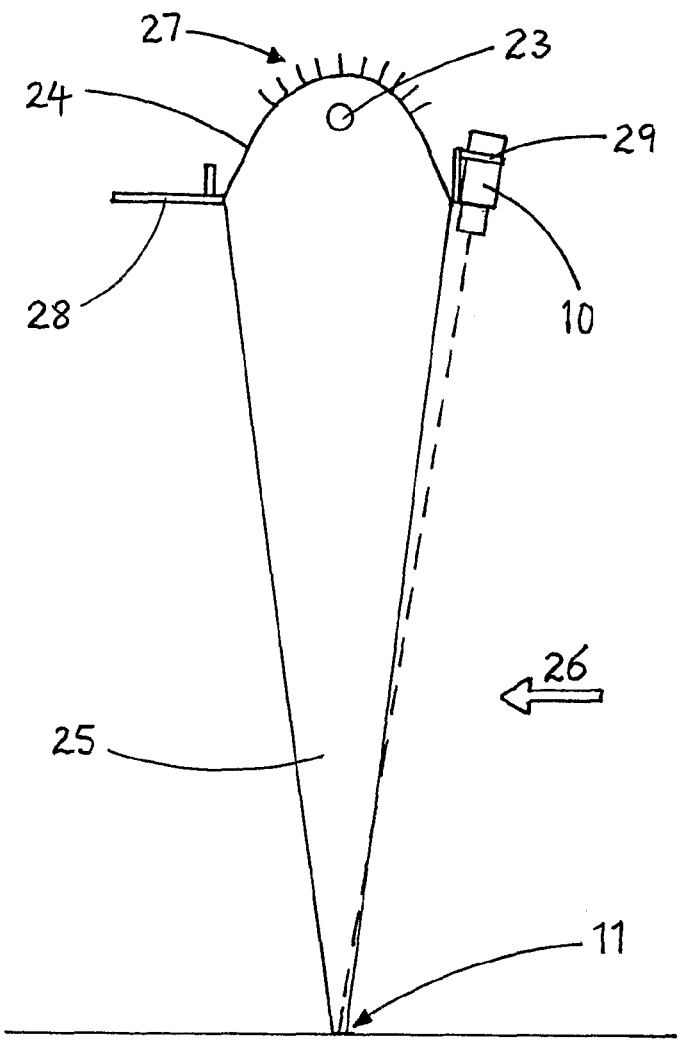
FIG. 7 is a schematic cross-sectional side elevation of a second access monitoring system embodying the invention.
Figure 8:
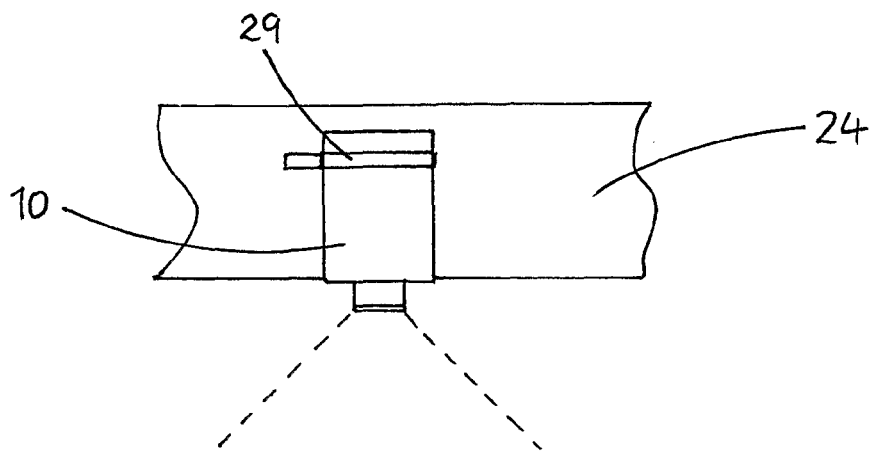
FIG. 8 is a schematic scrap frontal elevation of the access monitoring system shown in FIG. 7.

A preferred embodiment of the access monitoring system is shown in FIGS. 7 and 8. This employs a dedicated visible light source concentrated on the threshold 11 of the access point 7, rather than relying on the vagaries of ambient illumination or using relatively diffuse infra-red illumination of the access point 7 and its surroundings.

This system is provided with an elongate sodium discharge lamp 23, extending horizontally above the access point 7 within an elongate reflector 24 having a substantially parabolic cross-section. The sodium lamp 23 extends just off a focus of the parabolic reflector 24, such that the reflector 24 projects a converging beam 25, directed downwardly towards the threshold 11 of the access point 7. (NB: the vertical scale of FIG. 7 has been compressed significantly for clarity). Preferably, the lamp 23 and reflector 24 are arranged so as to produce a narrow illuminated strip across the threshold 11, extending perpendicularly to a direction of movement 26 of the conveyor 3,4 through the access point 7.

The reflector 24 may be provided with cooling fins 27 and/or other cooling arrangements, and is supported above the access point 7 by one or more first brackets 28. The line-scan camera 10 is mounted to the reflector 24, adjacent its midpoint, by means of a second bracket 29, and is so aligned that its linear field of view intersects with the beam 25 adjacent the threshold 11.

This arrangement produces an intense illumination in a strip along the threshold 11 from a relatively low-powered and economical sodium lamp 23. For example, while an ambient illumination suitable for office work might be around 200 lux, this arrangement can produce, concentrated in the illuminated threshold strip, around 4000 lux. This directs intense illumination exactly where the linear field of view of the line-scan camera 10 needs it, and nowhere else.

This brightly illuminated strip also has a psychological effect, since the bright orange glow along the threshold 11 actively discourages anyone from crossing it. It is also wholly implausible for anyone to claim that they crossed the threshold 11 accidentally because they did not notice it.

Figure 9:
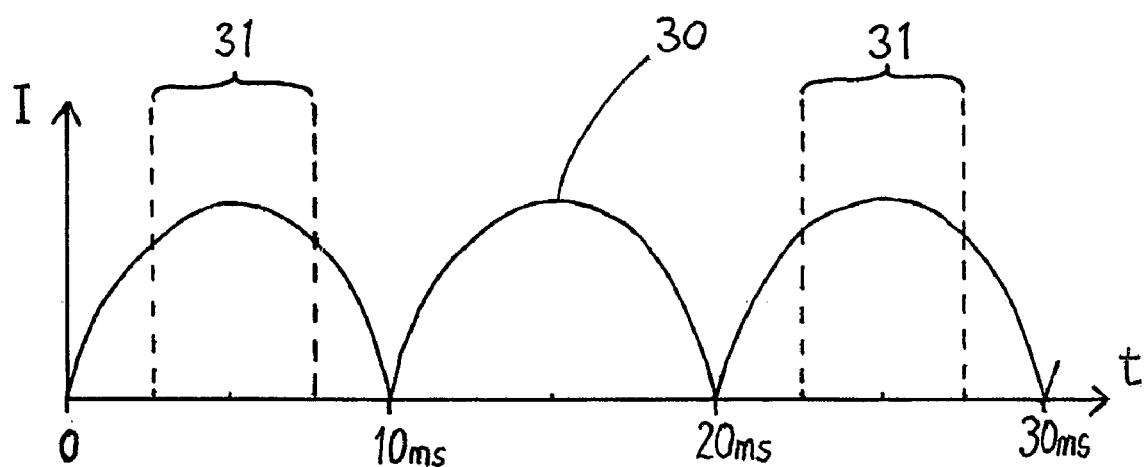
FIG. 9 is a graph of emitted light intensity against time for a sodium light source as used in the access monitoring system shown in FIG. 7.

Use of a sodium discharge lamp 23 brings further benefits. The light output of a discharge lamp varies with time, in line with the frequency of the alternating current (AC) electrical supply powering it. When the current is at zero, the light output is zero, while at a maximum or minimum of the sinusoidally varying current, the light output is at a maximum. FIG. 9 shows a graph 30 of emitted light intensity (I) against time (t), for a discharge lamp powered by a conventional UK mains AC supply operating at 50 Hz. There are thus a series of maxima of I, spaced 10 milliseconds apart. Under normal conditions, this 100 Hz intensity variation is too fast for the human eye to distinguish, and only a time-averaged intensity is observed.

However, an electronic imaging device, such as the line-scan camera, can take advantage of this variation. Given the intense illumination in the camera's 10 field of view, an exposure duration of five milliseconds is easily sufficient to produce a clear, reliable graph 14, 18 of reflected light intensity against position across the threshold 11. This five millisecond exposure duration 31 can be synchronised with the maxima of the emitted light from the lamp 23; for example, as shown in FIG. 9, the exposures 31 can be made to coincide with every other maximum in the graph 30. As a result, the average illumination during each exposure 31 is significantly greater than the overall average illumination, further improving the performance of the system.

Being able to take "snapshots" of the threshold 11 every twenty milliseconds, as shown in FIG. 9, allows much more detailed and precise tracking of items 2 and/or intruders 13 moving through the access point 7 than would be the case with conventionally "flashed" illumination.

Another particular advantage of the sodium lamp 23 is its effectively monochromatic output. The sodium "D lines", at wavelengths of 589.0 and 589.6 nanometers, make up its entire visible emission spectrum. Thus, all the energy of its light output is concentrated at substantially one frequency, rather than being spread across the whole visible spectrum, as for ambient light. The line-scan camera 10 is provided with a filter so that it is only sensitive to light at or near the sodium D-lines. Thus, it effectively only picks up light projected from the lamp 23 and reflected from the threshold 11, the conveyor 3,4, items 2 thereon and/or intruders 13. Variations in ambient illumination can thus be ignored, whether reflected or passing directly into the camera 10.

This embodiment of the access control system is also provided with an arrangement known as adaptive background control, to handle the problem shown in FIG. 6, where a change in illumination incident on the camera's field of view can appear to be a change in the reflected signal caused by a real change on the threshold 11. The background signal 20, 21 is checked at frequent intervals (preferably when nothing is passing through the access point 7) to ensure that no change in background illumination has occurred. Should a change be detected, this can be allowed for in the software carrying out the above tests on the graphs 14, 18.

Sodium lamps usually take some time to warm up and reach their rated light output, possibly as much as five minutes. Thus the adaptive background control also allows the system to be used before the lamp 23 has fully warmed up. It further removes the need for periodic recalibration of the system in case of a drift in the performance of the lamp 23 or the camera 10, as the regular operation of the adaptive background control will automatically compensate for this.

The apparatus described is thus simpler, more reliable and more robust than existing systems. It should also be more economical to build, install and run, thus potentially being applicable to many more situations than existing arrangements.

The invention claimed is:

1. An apparatus for monitoring a portal through an enclosure around a hazard, comprising detector means having a substantially linear field of view and adapted to detect electromagnetic radiation, said detector means being so mounted that said field of view comprises a linear portal threshold that extends along a boundary of the portal so as to detect electromagnetic radiation reflected from an object passing through said linear portal threshold, and distinguishing means to compare signals from said detector means representing a passing object with signals pre-identified as corresponding to the profile of the presence of an object intended to pass through said portal, to distinguish signals from said detector means not corresponding to the profile of the presence of an object intended to pass through said portal and to generate an alerting signal in response, wherein the distinguishing means compares a duration of the detected signal with an expected time for the passage of objects intended to pass through the portal and emits an alerting signal should the detected signal indicate passage of an object traveling faster than those intended to pass through the portal.

2. The apparatus as claimed in claim 1, wherein said detector means comprises line-scan camera means.

3. The apparatus as claimed in claim 1, wherein said detector means is sensitive to visible light.

4. The apparatus as claimed in claim 1, comprising a source of electromagnetic radiation, optionally visible light, so directed as to illuminate said linear portal threshold.

5. The apparatus as claimed in claim 4, wherein said source of electromagnetic radiation is provided with focusing means adapted to produce a narrow elongate illuminated strip extending substantially along said boundary.

6. The apparatus as claimed in claim 1, wherein said alerting signal initiates procedures to eliminate or reduce the hazard within the enclosure.

7. The apparatus as claimed in claim 6, wherein said alerting signal causes a stopping of operation of hazardous equipment.

8. The apparatus as claimed in claim 6, wherein said alerting signal causes a deploying of additional barrier means between the portal and the hazard.

9. The apparatus as claimed in claim 2, wherein said line-scan cameral means is sensitive to electromagnetic radiation outside the human visible spectrum.

10. The apparatus as claimed in claim 4, wherein the source of electromagnetic radiation is configured to operate at predetermined intervals.

11. An apparatus for monitoring a portal through an enclosure around a hazard, comprising detector means having a substantially linear field of view and adapted to detect electromagnetic radiation, said detector means being so mounted that said field of view comprises a linear portal threshold that extends along a boundary of the portal so as to detect electromagnetic radiation reflected from an object passing through said linear portal threshold, and distinguishing means to compare signals from said detector means representing a passing object with signals pre-identified as corresponding to the profile of the presence of an object intended to pass through said portal, to distinguish signals from said detector means not corresponding to the profile of the presence of an object intended to pass through said portal and to generate an alerting signal in response, wherein the apparatus comprises an adaptive background control arrangement.

12. The apparatus as claimed in claim 11, wherein said detector means comprises line-scan camera means.

13. The apparatus as claimed in claim 11, wherein said detector means is sensitive to visible light.

14. The apparatus as claimed in claim 11, comprising a source of electromagnetic radiation, optionally visible light, so directed as to illuminate said linear portal threshold.

15. The apparatus as claimed in claim 14, wherein said source of electromagnetic radiation is provided with focusing means adapted to produce a narrow elongate illuminated strip extending substantially along said boundary.

16. The apparatus as claimed in claim 11, wherein said alerting signal initiates procedures to eliminate or reduce the hazard within the enclosure.

17. The apparatus as claimed in claim 16, wherein said alerting signal causes a stopping of operation of hazardous equipment.

18. The apparatus as claimed in claim 16, wherein said alerting signal causes a deploying of additional barrier means between the portal and the hazard.

19. The apparatus as claimed in claim 12, wherein said line-scan camera means is sensitive to electromagnetic radiation outside the human visible spectrum.

20. The apparatus as claimed in claim 14, wherein the source of electromagnetic radiation is configured to operate at predetermined intervals.

\* \* \* \* \*